United States Patent [19]
Getzin

[11] 3,862,903
[45] Jan. 28, 1975

[54] UNIT FILTER RETAINING MEANS
[75] Inventor: Allan R. Getzin, Louisville, Ky.
[73] Assignee: American Air Filter Company, Inc., Louisville, Ky.
[22] Filed: May 14, 1973
[21] Appl. No.: 360,135

[52] U.S. Cl. ............... 210/232, 55/501, 55/504, 55/509, 210/495
[51] Int. Cl. ............................................. B01d 27/08
[58] Field of Search ...... 210/232, 483, 495; 55/501, 55/DIG. 31, 504

[56] References Cited
UNITED STATES PATENTS
2,252,724  8/1941  Myers ............................ 55/DIG. 31
2,361,186  10/1944  Fishbein et al. ............... 55/DIG. 31
2,771,155  11/1956  Palmore ........................ 55/DIG. 31

Primary Examiner—Frank A. Spear, Jr.

[57] ABSTRACT

A removable U-shaped filter retaining apparatus adapted to hold a unit filter in air tight relationship within a flow-through housing, one leg of the filter retaining apparatus being a biased wing portion which exerts constant pressure on the frame of a filter received by the retaining apparatus, the other leg of the filter retaining apparatus being an elongate channel member adapted to be attached to the filter housing. The biased wing portion further enables the filter retaining apparatus to accommodate filters of varying dimensions and provides for the filters to be easily inserted and removed from the housing.

5 Claims, 5 Drawing Figures

3,862,903

UNIT FILTER RETAINING MEANS

BACKGROUND OF THE INVENTION

Filter retainers for securing unit filters in a flow-through housing have previously failed to satisfactorily meet the requirements of being sturdy, easy to use, effective in forming an air-tight seal between the filter and housing, and yet inexpensive. In addition, an acceptable filter retaining apparatus should be capable of accommodating unit filters of varying dimensions. The prior art filter retaining apparatuses which have come even close to meeting the foregoing requirements have been expensive to fabricate and cumbersome to use. In addition, these prior art filter retaining means frequently included parts which projected from the filter frame, which were readily subject to damage and added additional shipping expense. The filter retainer of the present invention is a staightforward, inexpensive, readily constructed and easily installed retainer which satisfactorily meets all of the above requirements of a filter retainer.

SUMMARY OF THE INVENTION

The invention provides a filter retaining apparatus which can be readily attached to a flow-through housing and which accommodates various filters having considerable variance in their overall dimensions. The filter retaining apparatus is provided with a retaining wing which is biased to keep a constant pressure on the filter frame, thereby urging the frame into positive sealing engagement with the flow-through housing. More specifically, the present invention provides a unit filter retaining apparatus adapted to be received in a flow-through housing comprising: a U-shaped body portiom, one leg of said body portion being a resilient, inclined wing portion which functions to urge the frame of a unit filter into sealing relationship when positioned in said flow-through housing; and, the other leg being an elongate channel portion having first and second essentially parallel legs, said channel portion providing for the attachment of said filter retaining apparatus to said flow-through housing.

It has been found that when a plurality of the filter retaining apparatuses of this invention are spaced about the periphery of a flow-through housing and used to secure a filter therein they additionally function to center the filter with respect to the housing and maintain it in a centered condition.

DESCRIPTION OF THE PREFERRED EMBODIMENT

Figure 1:
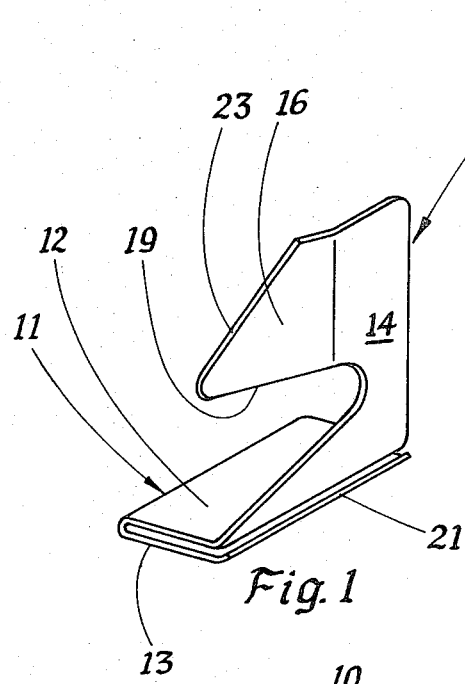
FIG. 1 is an isometric view of the unit filter retaining apparatus of this invention.
Figure 5:
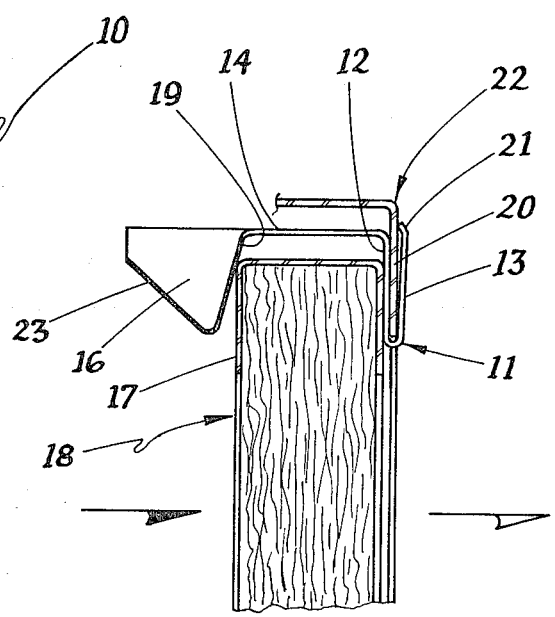
FIG. 5 is a front elevational view, partially in cross-section, showing the filter retaining apparatus as used to retain a unit filter in a flow-through housing.
Figure 2:
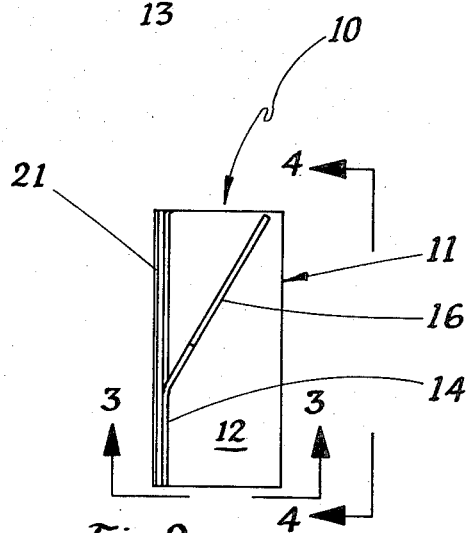
FIG. 2 is a plan view of a filter retaining apparatus similar to the apparatus of FIG. 1.
Figure 4:
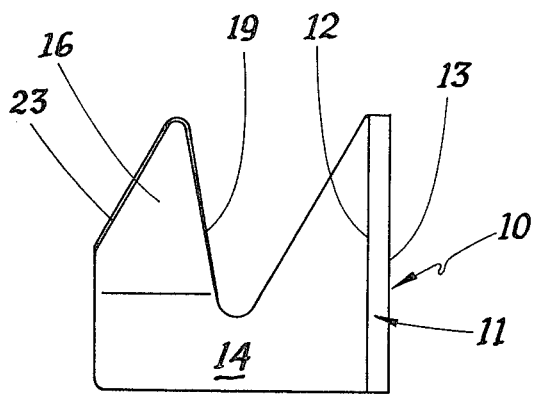
FIG. 4 is a side elevational view of the filter retaining apparatus of FIG. 2.

FIG. 1 shows filter retaining apparatus 10 comprised of U-shaped body portion 14, one leg of which is formed by U-shaped elongate channel portion 11 having first and second parallel legs 12 and 13. Leg 12 is an integral part of U-shaped body portion 14. Leg 13 is appended to the outermost extremity of leg 12. The other leg of U-shaped body portion 14 is formed by wing portion 16, which cooperates with channel portion 11 to receive a unit filter therebetween as shown in FIG. 5. Specifically, it can be seen from FIG. 5 that a filter frame 17 of a unit type filter 18 is held between leg 12 and angular edge 19 of wing portion 16. Wing portion 16 is biased downwardly as shown in FIG. 5 and because the incline of edge 19 abuts the frame 17 there is a constant pressure exerted on filter frame 17 urging it tightly against the upstream side of leg 12. Angular edge 19 also allows the filter retaining apparatus of this invention to accommodate various sized filters, by virtue of its inclination away from leg 12. As can be seen from FIG. 5, the filter retaining apparatus of this invention can accommodate a filter which is thinner and taller or shorter and thicker than the one shown.

Figure 3:
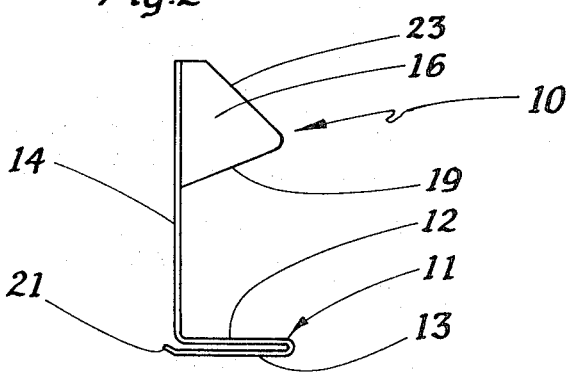
FIG. 3 is a front elevational view of the filter retaining apparatus of FIG. 2.

Advantageously, leg 13 may have lip 21 attached to its outermost extremity (FIG. 3). Lip 21 can be contoured so that it engages flange 20 of filter housing 22 causing the elongate channel portion 11 to be frictionally secured thereto. It should be noted, however, that it is not necessary to have legs 12 and 13 of equal length. For example, it may be advantageous in certain instances to have leg 13 of a length equal to flange 20 of filter housing 22. In such event, lip 21 may function to overlap the corner of flange 20 and thereby enhance the attachment of filter retaining apparatus 10 to filter housing 22. It has also been found advantageous to have U-shaped elongate channel portion 11 opening in a direction opposite to the direction of opening of U-shaped body portion 14, as shown in FIGS. 3 and 5; however, such opposite direction of opening is not imperative.

To install and use the filter retaining apparatus of this invention, elongate channel portion 11 is simply slid over the extending flange 20 of a filter housing 22. If flange 20 has a gasket member affixed to its upstream surface, this gasket member is removed to allow leg 12 to be fitted between flange 20 and the gasket. The retaining apparatus may project upstream or downstream from flange 20, but for reasons noted earlier it advantageously projects upstream into the filter housing.

In use several of the filter retaining apparatuses are positioned perimetrically around the opening of a flow-through housing, advantageously with their respective legs 12 between the housing flange and its upstream gasket, if any, to insure an air-tight seal between the filter and housing flange. A unit type filter 18 is then positioned so that it abutts edge 23 of wing portion 16. Pressure is applied to the unit filter 18 which causes biased wing portion 16 to move upwardly (FIG. 5), due to the force exerted on the inclined edge 23, until filter frame 17 passes thereunder and no longer engages edge 23 but rather is now engaged by edge 19. As previously mentioned, wing portion 16 is biased downwardly and thus there is a constant pressure transmitted through edge 19 to filter frame 17 urging filter frame 17 into air-tight contact against leg 12 or, if present, an upstream gasket. This constant urging of the filter frame into sealing engagement with the gasket continues during the entire time the unit filter is in position. Thus, if the upstream gasket deforms, the unit filter is still urged into air-tight sealing relationship therewith. Also, lip 21 attached to leg 13 urges the lower portion of leg 13 and the opposite side of leg 12 into air-tight contact with flange 20 of filter housing 22.

It should be further noted that because of the incline of edges 19 and 23 of wing portion 16 the filter is automatically centered when it is being placed into a filter frame and likewise automatically kept in a centered position while being retained in place. This automatic centering occurs by virtue of the fact that a multiplicity of unit filter retaining apparatuses are located around the periphery of the filter frames with each of the respective inclined edges 16 sloping inwardly toward the center of the frame. Thus as one locates the unit filter above the retaining apparatuses and begins to force it into position each of the inclined edges tends to cause the unit filter to become centered. Similarly, when the filter is in position the resilience of wing portion 16 exerting a force against the edge of the unit filter through edge 19 causes the filter to remain automatically centered. Thus the filter retaining apparatus of this invention provides a straightforward, inexpensive, readily constructed and easily maintained means for centering and retaining a unit filter within a filter frame. As can be realized from the preceding discussion, an additional feature of the unit filter retaining apparatus of this invention is that a unit filter may be secured in position in a flow-through housing without having to touch the retaining apparatus. Such a feature greatly simplifies the filter replacement procedure and results in a substantial savings of labor.

When a unit filter 18 is loaded with dust it is removed in a direction opposite from the direction in which it was inserted. It should be noted, however, that because angular edge 19 is more acute than edge 23 with respect to leg 12 it is necessary to lift wing portion 16 upwardly to remove the unit filter. it can be seen however that in the situation where four filter retaining apparatuses are located about the periphery of a flow through housing the wing portions 16 of only two need be lifted to effect removal, thus the removal operation is simple and straightforward involving less expenditure of time than removal of unit filters secured in position with conventional means.

Having thus described the invention what is claimed is:

1. A unit filter retaining apparatus adapted to be received in a flow-through housing comprising:
    a U-shaped body portion, one leg of said body portion being a resilient, inclined wing portion constructed to abut and urge the frame of a unit filter toward said flow-through housing and into sealing relationship when positioned in said flow-through housing; and,
    the other leg being an elongate channel portion having first and second essentially spaced parallel legs, said channel portion being adapted to receive an edge of said flow-through housing thereby attaching said retaining apparatus to said housing.

2. The filter retaining apparatus of claim 1 wherein said body portion is integral with said first essentially parallel leg of said elongate channel portion.

3. The filter retaining apparatus of claim 2 wherein said elongate channel portion includes an inwardly curved portion contiguous with said second parallel leg to enhance the attachment of said filter retaining apparatus to said filter frame.

4. The filter retaining apparatus of claim 1 wherein said elongate channel portion opens in opposite direction to the direction of opening of said U-shaped body portion.

5. The filter retaining apparatus of claim 1 comprising at least two inclined edges located on said resilient inclined wing portion one of which is constructed to center a unit filter as it is being positioned in said flow-through housing and the other constructed to hold said unit filter in a centered condition after it has been positioned in said housing.

* * * * *